No. 807,523. PATENTED DEC. 19, 1905.
J. DE W. WHIPPLE.
HORSE COLLAR.
APPLICATION FILED JAN. 30, 1904.
2 SHEETS—SHEET 1.
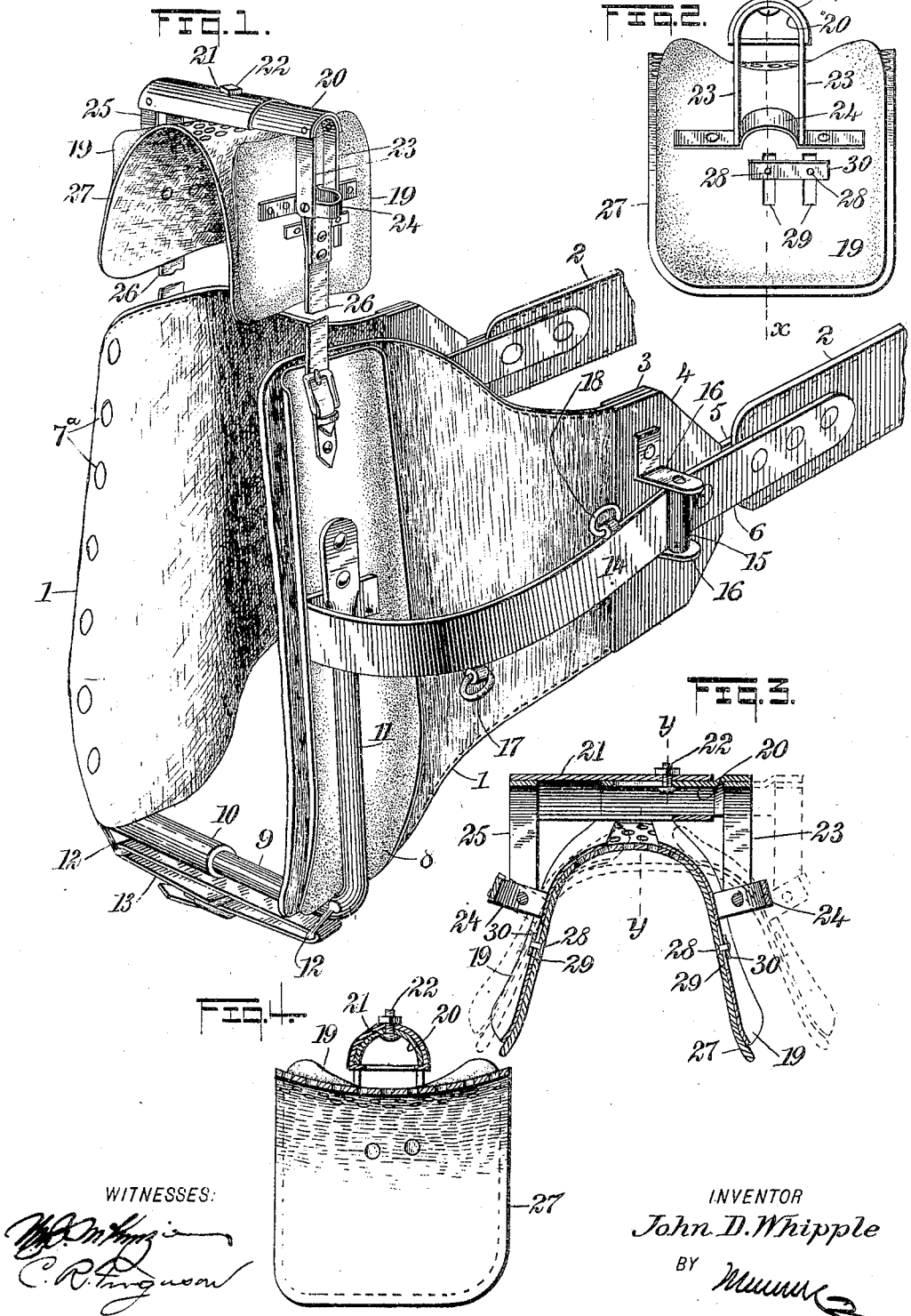
WITNESSES:
INVENTOR
John D. Whipple
BY
ATTORNEYS No. 807,523. PATENTED DEC. 19, 1905.
J. DE W. WHIPPLE.
HORSE COLLAR.
APPLICATION FILED JAN. 30, 1904.
2 SHEETS—SHEET 2.
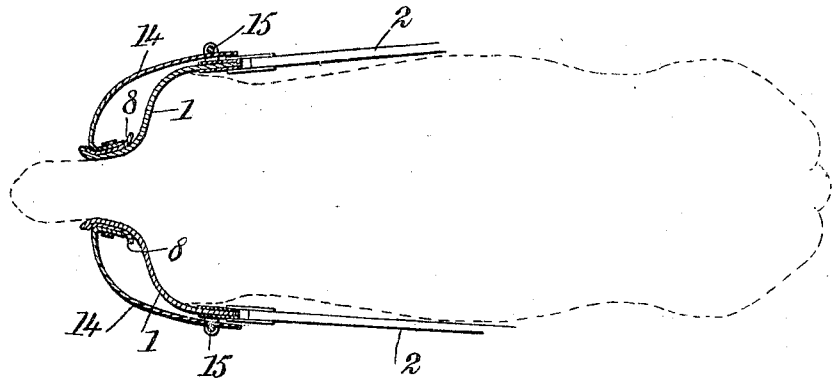
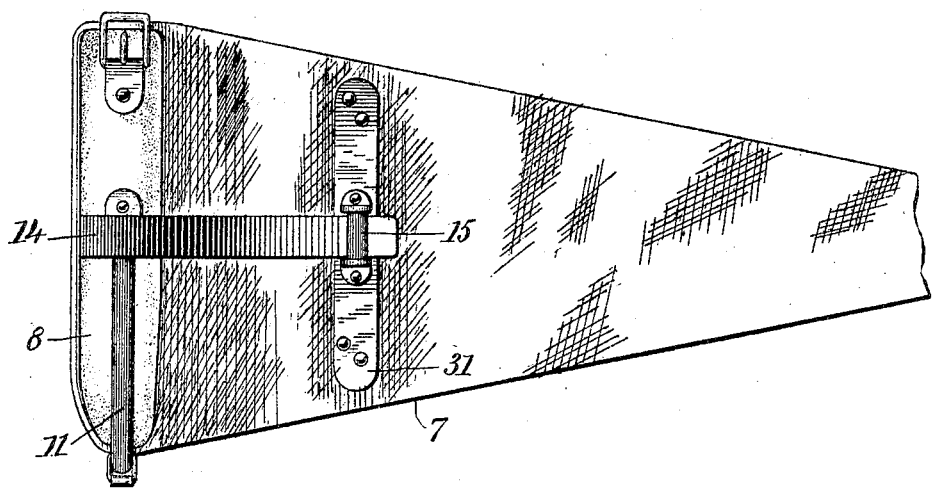
INVENTOR
John D. Whipple

UNITED STATES PATENT OFFICE.

JOHN DE WITT WHIPPLE, OF TEKAMAH, NEBRASKA.

HORSE-COLLAR.

No. 807,523.     Specification of Letters Patent.     Patented Dec. 19, 1905.

Application filed January 30, 1904. Serial No. 191,309.

*To all whom it may concern:*

Be it known that I, JOHN DE WITT WHIPPLE, a citizen of the United States, and a resident of Tekamah, in the county of Burt and State of Nebraska, have invented a new and Improved Horse-Collar, of which the following is a full, clear, and exact description.

This invention relates to improvements in draft-collars for horses, an object being to provide a collar that will readily adapt itself with yielding pressure to the neck and shoulders of an animal and practically prevent the formation of sores, as often happens, from abrasions with the usual form of collars.

I will describe a horse-collar embodying my invention and then point out the novel features in the appended claims.

Reference is to be had to the accompanying drawings, forming a part of this specification, in which similar characters of reference indicate corresponding parts in all the figures.

Figure 1 is a perspective view of a horse-collar embodying my invention. Fig. 2 is a side elevation of the upper or saddle portion thereof. Fig. 3 is a section on the line $x\,x$ of Fig. 2. Fig. 4 is a section on the line $y\,y$ of Fig. 3. Fig. 5 is a sectional view illustrating the manner in which the collar adapts itself to a horse, and Fig. 6 shows a modification.

The collar comprises draft or side leathers 1, the upper and lower edges of which converge from the front to the rear, and secured to the rear ends of the leathers 1 are the traces 2. As shown in Fig. 1, the traces 2 are pivotally connected to metal plates 3 4, respectively, on the inner and outer sides of the leathers, from which narrow plates 5 6 extend to the traces. In Fig. 6, however, I have illustrated a construction in which the traces are integral or direct continuations from side leathers 7, and this arrangement may be preferable in some instances—that is, for light work. Attached by means of rivets $7^a$ to the outer side of each leather 1 near the front end is a metal neck-plate 8, which is transversely curved or has its opposite edges turned slightly outward from the leather, and the lower end, it will be noted, is curved inward. Attached to the opposite plates 8 for securing the same together or preventing back and forth relative movement between the parts when on a horse's neck are telescopic members 9 10. These interlocking members 9 10 have upwardly-extended portions 11, through which rivets pass into the plates 8, and at the lower end or bend of each member is a loop 12 for receiving the fastening-strap 13.

Curved outward and then extended rearward from each plate 8 is a spring-metal plate 14, the free end of which engages with a roller 15, supported in brackets 16, attached to the plate 4. On the lower side of the spring-plate 14 a ring 17 is shown for the connection of a pole-strap, and a ring 18 on the upper side of the plate 14 is designed to engage with the back strap. However, these features may be omitted or otherwise formed. It will be noted that the inner sides of the draft or side leathers are longitudinally concaved, so as to engage closely yet yieldingly against the convexities of a horse's neck and shoulders, as indicated in Fig. 5. The spring-metal plates 14 will not only serve to maintain this concavity, but will prevent collapsing of the side leathers when there is no forward pressure on the collars. The plates will also serve to prevent lateral pressure of the side leathers and traces against a horse.

I will now describe the means shown for supporting the side leathers in place. This means comprises a saddle, consisting of side plates 19 of suitable light metal, and has adjustable and lateral swinging relation, so as to be fitted to the different sizes of horses. The means for permitting the spreading apart or toward and from each other of the metal plates 19 consists of two telescopic members 20 21, which are here shown as semicylindrical in cross-section; but it is to be understood that they may be otherwise shaped without departing from the spirit of my invention. When adjusted, the parts are held by means of a set-bolt 22 passing through an opening in the member 21 and through a longitudinal slot in the member 20. From the member 20 arms 23 extend downward to pivotal connection with a loop 24, formed of a strip of metal and riveted to one of the plates 19. Similar arms 25 extend downward from the sliding member 21 to pivotal connection with a similar loop 24 on the other plate 19. The saddle is adjustably connected to the draft or side leathers by means of straps 26.

Arranged between the plates 19 and designed to extend over the top of the neck is a leather neck-shield 27, the shield being so connected to the plates 19 that there is a relative sliding movement between the parts—that is, the plates may have sliding and swinging motion without causing a rubbing motion of the shield on the horse's neck. To provide for this relative sliding motion, pins 28 extend from the shield through slots 29, formed vertically in the plates 19, and the outer ends of these pins connect with plates 30, which slide on the outer sides of the plates 19. The neck-shield is preferably provided with a plurality of perforations, so as to permit of a free circulation of air to absorb moisture or perspiration.

It will be noted in this collar that the spring-plates 14 operating freely against the rollers 15 permit the draft or side leathers to readily adjust themselves to the various degrees of convexity of different horses' shoulders, and therefore a very comfortable collar is provided.

In Fig. 6 the roller 15 is connected to the side leathers by means of a metal strap 31.

Having thus described my invention, I claim as new and desire to secure by Letters Patent—

1. A horse-collar comprising neck and shoulder engaging side or draft leathers, vertically-disposed plates secured to the front ends of said side leathers, and spring-yielding connections between said plates and side leathers of each side.

2. A horse-collar comprising neck and shoulder engaging side or draft leathers, vertically-disposed plates secured to said leathers near the front end, outwardly and rearwardly curved spring-plates extended from said vertical plates, and sliding connection between said spring-plates and the side leathers, whereby a curving is permitted lengthwise of the side leathers at the inner side.

3. A horse-collar comprising side or draft leathers, transversely-curved metal plates secured to the outer sides of said leathers near the front, telescopic connections between the opposite plates, and a supporting-saddle for the leathers.

4. A horse-collar comprising side draft-leathers, diminishing in width from the front rearward, traces extended from the rear ends, vertically-disposed and transversely-curved metal plates secured to the outer sides of the leathers near the front, telescopic connections between the lower ends of said plates, a supporting-saddle having connection with the plates, and spring connections between said plates and the rear portions of the side leathers.

In testimony whereof I have signed my name to this specification in the presence of two subscribing witnesses.

JOHN DE WITT WHIPPLE.

Witnesses:
H. N. MORROW,
I. C. ALLEN.